United States Patent Office 2,947,646
Patented Aug. 2, 1960

2,947,646

COLLOIDAL DISPERSION OF METALS IN PLASTICS

Richard G. Devaney and John W. Tamblyn, Kingsport, Tenn., assignors to Eastman Kodak Company, Rochester, N.Y., a corporation of New Jersey No Drawing. Filed Jan. 7, 1958, Ser. No. 707,454

8 Claims. (Cl. 106—193)

This invention concerns the preparation of metal particles of very fine particle size. More particularly, this invention concerns the production of metallic pigments for use in plastics.

The incorporation of metallic pigments in paints and plastic compositions has long been practiced for both decorative and protective purposes. For instance, metallic powders, pulverized filling materials, mineral powders, soluble dyes, insoluble dyes, dyestuffs, mica, asbestos, and the like have been used. Special effects can be obtained by using metal flakes. Metal may be floured and the metal flour bound together with a grease such as lard and the flour mixture added to cellulose acetate and molded to produce an article which gives a metallic appearance.

The pigments used in the prior art have usually had a particle size range of 0.1 to 100 microns in diameter. However, we have found that much finer dispersions of metals in plastics may be obtained by special techniques wherein substantially all the particles are below 0.1 micron in diameter.

The dispersions obtained of the small metal particles in plastic vary in appearance from pale transparent colors to opaque, the color and intensity depending on the nature of the metal, its average particle size, its degree of dispersion, is concentration and the thickness of the plastic sample containing the dispersion.

One object of this invention is to produce very small metallic particles having a particle size below about 0.1 micron in diameter. Another object of this invention is to provide a plastic material having a very finely dispersed metal therein. An additional object is to provide a process for dispersing metal in plastics in which a very small amount of metal is required. A further object is to prepare colloidal dispersions of the metals in plastic media such as fibers, films, sheets, and molded shapes. An additional object is to obtain decorative effects such as pale, transparent colors or grays and blacks of varying intensity, iridescence, pearlescence, and semi-transparency. Another object is to obtain heat and light stable colors. A further object is to obtain protective effects such as stabilization of the plastic material against the damaging action of sunlight. Another object is to provide films useful as photographic filters. Other objects will be apparent from the description and claims which follow.

The above objects are obtained by first depositing a thin coating of metal onto finely powdered plastic components and then working the metal-coated plastic powder thus obtained into a plastic state with or without additional plastic or other ingredients such as plasticizers. The working operation results in the fragmentation of the metal coating into very small metallic particles the average diameter of which is not greater than the thickness of the metal coating. The plastic may then be fabricated into final shapes by customary plastic processing methods.

Example 1.—Aluminum was vaporized in a RCA vacuum evaporator and coated onto a powder precipitate of cellulose acetate butyrate spread out in a thin layer on a glass tray. The coated powder was then stirred up to expose a fresh surface and the coating process repeated. Altogether 0.1% of aluminum, based on the weight of the cellulose ester, was applied in this manner. One hundred parts of the metallized powder was mixed with eight parts of dibutyl sebacate and rolled at 290° F. for four minutes. Fifty-mil thick sheets were then compression molded. These were a pleasing gray in color, opaque when viewed by reflected light and semi-transparent by transmitted light. The aluminum was sub-microscopically dispersed.

Example 2.—Copper was dispersed in the same plastic composition and in the same way as in Example 1. A transparent gray-green, 50-mil sheet was obtained which had a slightly hazy cast. Dispersion of the metal particles was sub-microscopic.

Example 3.—Example 2 was repeated except that the cellulose acetate butyrate powder was kept agitated with a vibrator while the evaporated copper was being applied. The clarity of the resulting pale green 50-mil sheet was improved over that of Example 2. No metal particles with diameters greater than 0.005 micron were visible with the electron microscope.

Example 4.—Results similar to those of Examples 2 and 3 were obtained with gold. The color of the 50-mil sheets in this case was pink by transmitted light and brownish-pink by reflected light. The metallic particles in this dispersion were substantially all below 0.06 micron in diameter.

Example 5.—Germanium, applied in a manner similar to that used for copper in Example 3, gave a transparent pinkish-brown, 50-mil sheet.

Example 6.—Results similar to those of Example 1 were obtained when cellulose acetate was used as the polymer powder and 40 parts of diethyl phthalate as the plasticizer.

Example 7.—Results similar to those of Example 4 were obtained when the powdered plastic base used was 100 parts of polyvinyl chloride with 30 parts of di-n-octyl phthalate as plasticizer and four parts of di-n-butyl tin dilaurate as heat stabilizer.

Example 8.—Results similar to those of Example 4 were obtained when the powdered plastic base used was polystyrene.

Example 9.—Results similar to those of Example 4 were obtained when the powdered plastic base used was polyethylene.

Example 10.—Results similar to those of Example 4 were obtained when the powdered plastic base used was polypropylene.

From the above examples it can be seen that other metals and other plastic media may be used in the practice of our invention. Moreover, higher or lower concentrations of metal than shown in the examples may be employed. Various effects may be produced using our process depending on the nature of the metal, the average particle size, the degree of dispersion, concentrations, and on the thickness of the final plastic product. For instance, low concentrations of colloidally dispersed metal may be used to give heat- and light-stable pastel shades of color in plastic articles made into films, fibers or molded articles. High concentration of the dispersed metal may be used to obtain various decorative stable color effects. Different metals may be used in the same plastic article for varying effects. As is typical of colloidal dispersions, the appearance and color depend upon the angle upon which the dispersion is viewed.

In the manufacture of dope-spun or melt-spun fibers, it is often difficult to obtain good direct dispersions of certain colors. Well-dispersed gray tints can be incorporated in such fibers by the addition of small amounts of plastic master batch containing a high concentration of colloidally dispersed metal. Pearlescence and other decorative effects may be obtained in plastic compositions by compounding together as a biphase mixture, two mutually incompatible plastic, one of which contains a relatively high concentration of colloidally dispersed metal.

Films containing a colloidally dispersed metal prepared in accordance with our invention may be used in the preparation of photographic filters. For example, a cellulose acetate film containing colloidally dispersed gallium has been found to very closely approximate a perfect neutral gray filter. The absorption curve through the visible region is closer to horizontal than that given by a neutral density silver filter of the type used in photographic work.

In the broader aspects of our invention, any metal which is colloidally stable may be used. By this we mean that upon aging the dispersed particles do not diminish or grow to a size outside the colloidal range. We have found that the metals gold, aluminum, copper, germanium, silver, iron, cadmium, tin, lead and gallium are especially suited to our invention.

In the broader aspects of our invention, any plastic material which may be prepared in or converted into a finely divided or powdered state and subsequently worked into a plastic mass may be used. Such plastics include cellulose esters, polyesters and vinyl polymers. The plastics which we have found especially advantageous to use include cellulose acetate, cellulose acetate butyrate, polystyrene, polyvinyl chloride, polyethylene and polypropylene.

Particle size of the plastic powder which is coated is not critical, but to obtain useful concentrations of metal in the final plastic, powders of 20 mesh or finer should be used.

In the practice of our invention the metal may be deposited onto the plastic powder under high vacuum while the powder is in either an unagitated or agitated condition. However, if metal particles of uniform size are desired in the final plastic, it is preferable that the plastic powder be agitated during the coating step so that the metal coating which is applied to the powder particles is of uniform thickness. A fairly uniform coating may be obtained when the plastic powder is spread out in a thin layer and stirred between successive coating steps as in Example 1. An even more uniform coating is obtained when the powder is agitated continuously during the coating step as, for example, by means of a vibrator.

The metal coating applied to the plastic particles should not be thicker than the maximum desired diameter of the metal particles in the final plastic. While any suitable method for applying this thin coating may be used, we prefer to evaporate and condense the metal on the plastic powder particles under high vacuum.

Following the coating operation, the coated powder is worked into a plastic state by any conventional means, whereupon the metal coating is fragmented into metallic particles the average diameter of which is not greater than the thickness of the coating. For example, the powder may be worked between heated rolls or it may be extruded. In this way dispersions are obtained wherein substantially all the particles are less than 0.1 micron in diameter. Dispersions may be made wherein substantially all the particles are less than any desired diameter in the colloidal range, for example 0.01 micron, by coating the plastic powder to the appropriate thickness.

This application is a continuation-in-part of our application Serial No. 504,691, now abandoned, filed April 28, 1955.

We claim:

1. A process for preparing a dispersion of metal selected from the class consisting of gold, aluminum, copper, germanium, silver, iron, cadmium, tin, lead and gallium in an organic thermoplastic material wherein substantially all of the metal particles are less than 0.1 micron in diameter comprising depositing the metal as a thin coating having a thickness of less than 0.1 micron on powdered organic thermoplastic components fine enough to pass a 20 mesh screen, and working the coated powder into a plastic state to fragment the metal coating into metallic particles of less than 0.1 micron in diameter.

2. A process according to claim 1 wherein the thermoplastic material is cellulose acetate butyrate.

3. A process for preparing a dispersion of metal selected from the class consisting of gold, aluminum, copper, germanium, silver, iron, cadmium, tin, lead, and gallium in an organic thermoplastic material wherein substantially all the metal particles are less than 0.1 micron in diameter comprising depositing the metal as a coating having a thickness of less than 0.1 micron under a high vacuum while agitating the powder, and working the coated powder into a plastic state to fragment the coating into particles of less than 0.1 micron in diameter.

4. A process for preparing a dispersion of gold in cellulose acetate butyrate wherein substantially all the gold particles are less than 0.1 micron in diameter comprising depositing the gold as a thin coating of less than 0.1 micron in thickness onto finely divided cellulose acetate powder of no larger than 20 mesh under a high vacuum while agitating the powder and working the powder into a plastic state to fragment the gold coating.

5. A metal containing composition consisting essentially of an organic thermoplastic material containing dispersed therein particles of a colloidally stable metal selected from the class consisting of gold, aluminum, copper, germanium, silver, iron, cadmium, tin, lead and gallium, wherein substantially all the metal particles are prepared according to the process of claim 1.

6. A metal containing composition consisting essentially of cellulose acetate butyrate containing dispersed therein particles of a colloidally stable metal selected from the class consisting of gold, aluminum, copper, germanium, silver, iron, cadmium, tin, lead and gallium, wherein substantially all the metal particles are prepared according to the process of claim 1.

7. A metal containing composition consisting essentially of polyethylene containing dispersed therein particles of a colloidally stable metal selected from the class consisting of gold, aluminum, copper, germanium, silver, iron, cadmium, tin, lead and gallium, wherein substantially all the metal particles are prepared according to the process of claim 1.

8. A metal containing composition consisting essentially of cellulose acetate butyrate containing dispersed therein gold particles having a diameter of less than 0.1 micron prepared according to the process of claim 4.

References Cited in the file of this patent

UNITED STATES PATENTS

| | | |
|---|---|---|
| 1,792,262 | Wilson | Feb. 10, 1931 |
| 2,721,357 | Hochberg | Oct. 25, 1955 |
| 2,761,849 | Coler | Sept. 4, 1956 |
| 2,839,378 | McAdow | June 17, 1958 |
| 2,864,774 | Robinson | Dec. 16, 1958 |

OTHER REFERENCES

Badger et al.: The Glass Industry, November 1939, pp. 407–414.

Delmonte: Modern Plastics, May 1949, pp. 87, 90 and 140.